UNITED STATES PATENT OFFICE.

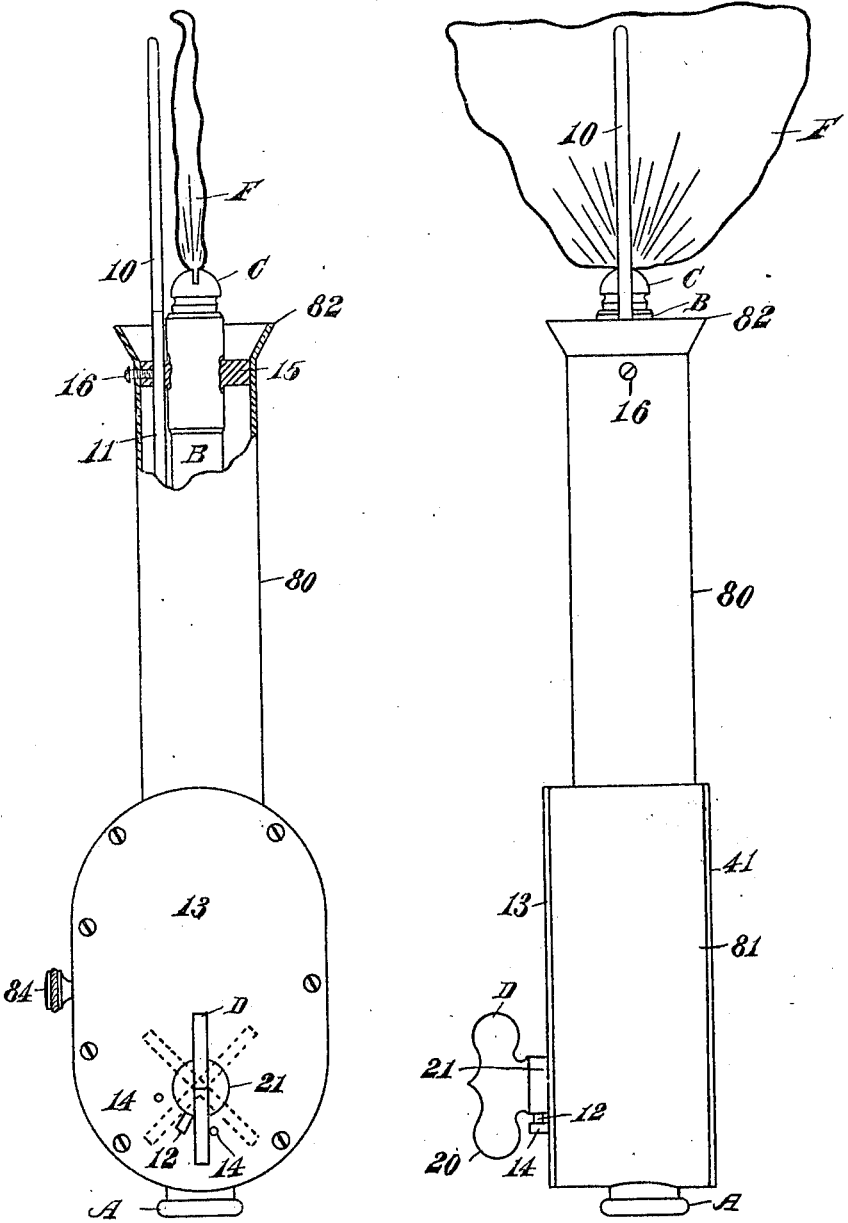

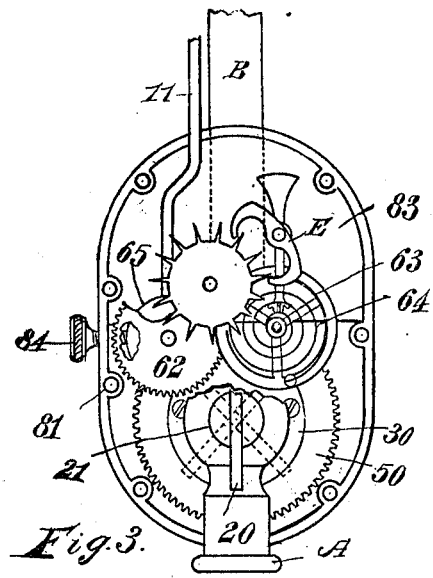
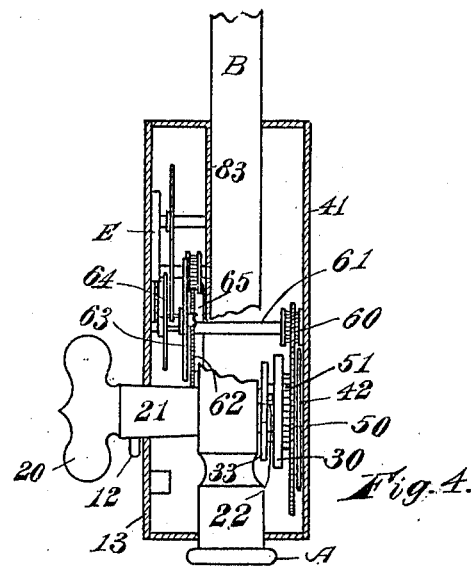
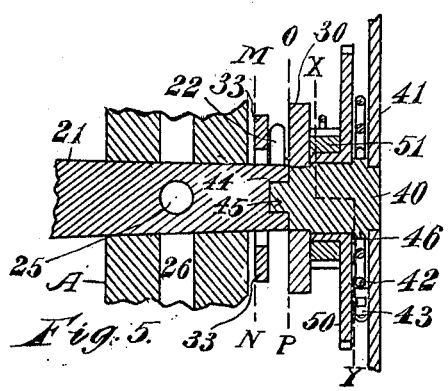
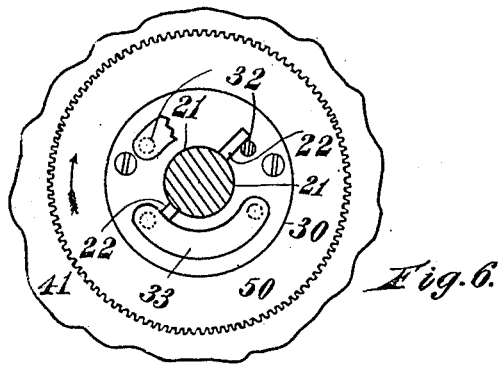
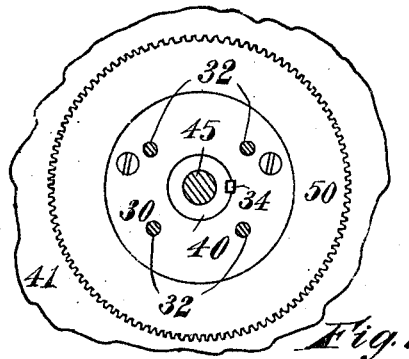
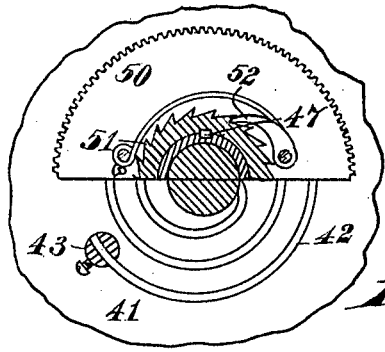

WILLIAM BRENNAN, OF LOWELL, MASSACHUSETTS.

AUTOMATIC SHUT-OFF VALVE.

955,844.   Specification of Letters Patent.   Patented Apr. 26, 1910.

Application filed August 16, 1909. Serial No. 513,152.

*To all whom it may concern:*

Be it known that I, WILLIAM BRENNAN, a citizen of the United States, residing at Lowell, in the county of Middlesex and State of Massachusetts, have invented certain new and useful Improvements in Automatic Shut-Off Valves, of which the following is a specification.

My invention relates to automatic shut off valves or cocks for burners of illuminating gas.

The purpose of my invention is to stop the flow of gas when the cock is opened and the gas is not lighted; as for instance, when the gas flame is blown out. My device will also close the gas cock, if it is accidentally turned on or if it is turned on and the gas is not lighted from any cause.

The special advantages of my invention are that when the gas is turned on and lighted, the cock will be closed a very little distance by a clock work mechanism, and will then be stopped by a thermostat actuated by the heat of the flame. If the flame is blown out, the thermostat contracts and allows the clock work mechanism to entirely close the cock, thus shutting off the gas after several minutes.

With my device, it is not necessary to hold the cock open with the hand until the thermostat is heated. Moreover the cock can be turned off by hand, or can be turned part way off so as to turn the gas flame down, without affecting the mechanism. When the gas flame is so turned down, the thermostat still keeps the cock from closing, until the flame ceases to burn.

The operation of my device is as follows. The turning of the gas cock the usual one quarter turn winds a main spring which is connected with an escapement. This escapement prevents the main spring from closing the cock instantly, but allows it to be closed in the course of several minutes. Meantime, however, if it is lighted, the gas heats a thermostat which expands and comes in contact with a brake wheel attached to the clock work system, thereby stopping the clock work. If the gas is not lighted, the cock will be closed after a few minutes. When the gas is turned on and lighted, the cock begins to close, but before it is closed to any appreciable extent, the thermostat operates as a brake and holds the cock in the open position. When the flame ceases to burn from any cause, the thermostat contracts and releases the brake wheel, whereupon the clock work again begins to operate and gradually closes the cock, thus shutting off the gas.

In the drawings Figure 1 is a side view of my device attached to a gas burner. Fig. 2 is a front view thereof. Fig. 3 is a side view with the side casing plate removed. Fig. 4 is a front view with part of the casing removed. Fig. 5 is an enlarged detail sectional view similar to Fig. 4. Fig. 6 is a sectional view from the left as on line M—N of Fig. 5. Fig. 7 is a similar sectional view as on line O—P, and Fig. 8 is a similar sectonal view as on line X—Y of Fig. 5.

My device comprises an ordinary gas cock body A which fits the gas pipe, and is continued from the gas cock seat in the form of a burner tube B as shown. This tube may be integral with the gas cock body as shown and is preferably made of iron. The burner tube B carries on its upper end the usual lava tip C, which to a certain extent insulates the iron of the tube from the heat of the gas flame. At the top of this tube by means of a collar 15 and an adjusting screw 16, I attach a thermostat rod 10, 11 the upper part of which 10 is preferably of brass and extends near but not into the flame F. The lower part 11 is preferably of copper and runs downward to the brake wheel 65 to be hereafter described. The heat from the gas flame F heats the upper brass end 10 of my thermostat and the heat is conducted therethrough to the copper end 11, thereby expanding or lengthening it. It expands more than burner tube B on account of being copper while tube B is steel or iron, and on account of lava tip C which insulates tube B.

The gas cock D carries a finger 12 and the adjoining side casing plate 13 carries stop pins 14, 14 which permit the cock to turn only 90 degrees. The cock D is of any usual type comprising a thumb piece 20 and a perforated stem 21 which passes into a tight seat in body A. It is so arranged that a quarter turn will make its valve passage 25 register with the passage 26 in body A and tube B thus allowing a full flow of gas. This stem 21 of cock D extends entirely through body A and is formed with a circular recess 44 in its end to receive the reduced end 45 of the spring spindle 40. Stem 21 near its end adjoining recess 44 carries preferably two winding pins 22, 22 adjacent to the inner face of winding disk 30. This winding disk 30 is carried by the inner end of spring spindle 40. It may be fixed thereto by a key 34.

In the path of each winding pin 22, I insert in winding disk 30, preferably two pins, 32 which I will call disk pins. I connect the tops of each set of two disk pins 32 by a retaining plate 33 which extends over winding pins 22 and thus prevents cock D from being pulled out of its seat.

One end of spring spindle 40 has a shoulder which rests against the end of stem 21 and projects at 45 into recess 44 in the end thereof. Near its other end it has a rim 46 which rests against the casing plate 41 and serves to hold main gear 50 in position.

Spring spindle 40 at its outer end bears in the casing 41 and is attached to one end of the main spring 42. The other end of main spring 42 is attached to casing 41 at 43. It is evident that by turning cock D in the direction of the arrow in Fig. 6, the winding pins 22 will engage disk pins 32 and will wind up the main spring 42 to the extent to which it is turned. If left to itself, main spring 42 would unwind and promptly turn cock D back to its original position thus shutting off the flow of gas. To prevent main spring 42 from closing the cock D too quickly, I provide a pawl 52, a main gear 50, and a clock work escapement system E.

On the spindle 40 between rim 46 and winding disk 30, I loosely pivot the main gear 50 to which is attached by a key 47 or otherwise, a ratchet wheel 51. To the winding disk 30 adjoining this ratchet wheel, I attach a spring pressed pawl 52 which engages the ratchet 51. Thereby, when the gas is turned on and the main spring 42 tends to return the cock D to its normal position, it must also revolve the ratchet 51 and main gear 50. This main gear 50 connects with any suitable escapement device E which will prevent it from revolving rapidly and which produces the result of permitting the cock to be closed slowly. In the drawings, I show this connection by the pinion 60, shaft 61, and gear 62. The balance wheel 63 and hair spring 64 and the whole escapement device E are of any well known construction.

Gear 62 carries a brake pulley 65 to which the lower end 11 of the thermostat extends. It is apparent that as the thermostat expands by the heat, it will bear against this pulley and stop the clock work and the closing of the gas cock D. It is also apparent that the gas cock D is free to be turned back after it is once turned on except for the gradual closing by the main spring. As this closing is stopped by the thermostat, the cock can be turned back and forth between pins 14 and 14 and the gas can be turned up or down freely. If, however, at any time the flame is extinguished, the thermostat is retracted and the clock work operates to slowly shut off the gas.

I prefer to inclose burner tube B and the lower leg 11 of the thermostat in a burner casing 80. This casing rests on top of the casing 13, 41, 81 for the clock work and fits around collar 15. It also preferably terminates at the top in a flange 82 which extends above collar 15 and forms a cup which catches any soot which might be formed on the upper leg 10 of the thermostat and drop therefrom.

I find it convenient to use a separate plate 83 to support the inner ends of the escapement shafts.

What I claim as my invention and desire to cover by Letters Patent, is:

1. An automatic shut off device for gas burners which comprises a cock, winding pins carried thereby, a main spring, a spindle therefor, a winding disk carried by the spindle, disk pins thereon which engage the winding pins, a spring pressed pawl carried by the winding disk, a main gear loosely carried by said spindle, a ratchet carried by the main gear in operative relation with said pawl, a thermostat rod proximate the gas flame and extended downward, and an escapement system operated by the main gear and comprising a brake pulley proximate the end of the thermostat.

2. In an automatic shut off device for gas burners, a burner tube, a cock seated therein, winding pins carried thereby, a spring spindle, a casing, a main spring attached to the spindle and to the casing, a winding disk carried by the spindle, proximate the winding pins, disk pins carried by the disk in operative relation to the winding pins, a retaining plate which connects said pins, a spring pressed pawl carried by the winding disk, a main gear loosely carried by said spindle, a ratchet carried by the main gear in operative relation to said pawl, and a gear which engages the main gear and carries a brake pulley, combined with an escapement system operative by the brake gear, and a thermostat rod carried by the burner tube proximate the gas flame and extended upward therefrom and downward to said brake pulley.

3. An automatic shut off device for gas burners, which comprises a gas cock body, a cock seated therein, and a burner tube formed of iron extended therefrom, combined with a main spring, means connected with the gas cock for winding the main spring, an escapement system connected with the main spring and comprising a brake pulley, and a thermostat rod carried at its intermediate portion by the burner tube and comprising a brass portion which extends upward proximate the gas flame and a copper portion which extends downward in operative relation with said brake pulley.

4. In an automatic shut off device for gas burners, the combination of a burner tube, an insulating tip therefor, a valve, mechanism for operating the valve, and a thermostat rod affixed near its middle portion to the burner tube and extending upward therefrom proximate the gas flame and downward in operative relation with the mechanism for operating the valve, the said thermostat rod being composed below its point of support of a single material of greater expansibility by heat than the burner tube.

5. In an automatic shut off device for gas burners, the combination of a burner tube, an insulating tip therefor, a valve, mechanism for operating the valve, a thermostat rod composed of a single material of greater expansibility by heat than the burner tube running from proximate the gas flame to operative relation with the valve mechanism, and means for supporting the thermostat rod near its middle portion in adjustable relation with the burner tube.

In testimony whereof I hereto affix my signature in presence of two witnesses.

WILLIAM BRENNAN.

Witnesses:
FISHER H. PEARSON,
GARDNER W. PEARSON.